(12) United States Patent
Krause et al.

(10) Patent No.: US 11,396,100 B2
(45) Date of Patent: Jul. 26, 2022

(54) ROBOT CALIBRATION FOR AR AND DIGITAL TWIN

(71) Applicant: Fanuc America Corporation, Rochester Hills, MI (US)

(72) Inventors: Kenneth W. Krause, Rochester Hills, MI (US); Derek Jung, Clinton Township, MI (US); Leo Keselman, Ferndale, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 211 days.

(21) Appl. No.: 16/566,520

(22) Filed: Sep. 10, 2019

(65) Prior Publication Data

US 2020/0078948 A1 Mar. 12, 2020

Related U.S. Application Data

(60) Provisional application No. 62/729,174, filed on Sep. 10, 2018.

(51) Int. Cl.
*B25J 9/16* (2006.01)
*G06T 7/73* (2017.01)
*B25J 13/08* (2006.01)

(52) U.S. Cl.
CPC ........... *B25J 9/1692* (2013.01); *B25J 9/1605* (2013.01); *B25J 9/1697* (2013.01); *B25J 13/089* (2013.01); *G06T 7/75* (2017.01)

(58) Field of Classification Search
CPC ...... B25J 9/1692; B25J 9/1605; B25J 9/1697; B25J 13/089; G06T 7/75
See application file for complete search history.

(56) References Cited

U.S. PATENT DOCUMENTS 7,818,091 B2 * 10/2010 Kazi .................. G06T 7/73
700/259
8,997,438 B1 4/2015 Fallas
(Continued)

FOREIGN PATENT DOCUMENTS

EP 2951788 B1 5/2018
WO 2017042551 A1 3/2017

OTHER PUBLICATIONS

PCT International Search Report of the International Searching Authority dated Oct. 28, 2019 dated Nov. 25, 2019 for International Application No. PCT/US2019/050462 filed Sep. 10, 2019.

*Primary Examiner* — Nicholas Kiswanto
(74) *Attorney, Agent, or Firm* — John A. Miller; Shumaker, Loop & Kendrick, LLP

(57) ABSTRACT

A method and system for calibration of an augmented reality (AR) device's position and orientation based on a robot's positional configuration. A conventional visual calibration target is not required for AR device calibration. Instead, the robot itself, in any pose, is used as a three dimensional (3D) calibration target. The AR system is provided with a CAD model of the entire robot to use as a reference frame, and 3D models of the individual robot arms are combined into a single object model based on joint positions known from the robot controller. The 3D surface model of the entire robot in the current pose is then used for visual calibration of the AR system by analyzing images from the AR device camera in comparison to the surface model of the robot in the current pose. The technique is applicable to initial AR device calibration and to ongoing device tracking.

24 Claims, 3 Drawing Sheets

(56) References Cited

U.S. PATENT DOCUMENTS

| | | | |
|---|---|---|---|
| 9,643,314 B2* | 5/2017 | Guerin | B25J 9/1605 |
| 10,052,765 B2* | 8/2018 | Kamoi | B25J 9/1671 |
| 10,350,751 B2* | 7/2019 | Guerin | B25J 9/1605 |
| 11,052,288 B1* | 7/2021 | Berme | G06F 3/011 |
| 2017/0056970 A1* | 3/2017 | Chin | B33Y 30/00 |
| 2017/0091999 A1 | 3/2017 | Blumenfeld et al. | |
| 2017/0182657 A1 | 6/2017 | Rose et al. | |
| 2017/0195554 A1 | 7/2017 | Shatz et al. | |
| 2018/0114064 A1 | 4/2018 | Schnittman | |
| 2019/0096134 A1* | 3/2019 | Amacker | G05D 1/0038 |
| 2021/0170603 A1* | 6/2021 | Kotlarski | B25J 9/1666 |

* cited by examiner

ROBOT CALIBRATION FOR AR AND DIGITAL TWIN

CROSS-REFERENCE TO RELATED APPLICATIONS

This application claims the benefit of the priority date of U.S. Provisional Patent Application Ser. No. 62/729,174, titled ROBOT CALIBRATION FOR AR AND DIGITAL TWIN, filed Sep. 10, 2018.

BACKGROUND

Field

The present disclosure relates to the field of industrial robots and, more particularly, to a method for calibration of an augmented reality (AR) device's position and orientation based on a robot's positional configuration, where a conventional visual calibration target is not required, the AR system is provided with a static CAD model of the entire robot in a current pose as a reference frame, and 3D models of the individual robot arms are combined into a single object model for visual calibration of the AR system.

Discussion of the Related Art

The use of augmented reality (AR) systems in conjunction with industrial robots is known in the art. An AR system can be used, for example, in teaching a robot how to perform a certain operation, where a skilled operator uses the AR system to demonstrate the operation and the robot learns the motions involved. The AR system can also be used for other teaching activities, such as establishment of virtual safety zones into which the robot must not encroach, or establishment of boundaries for each robot in a multi-robot system for picking parts from a conveyor. The AR representation of the physical robot is sometimes called the "digital twin".

In order for the digital twin to appear and move exactly like the physical twin, and for any virtual items to be displayed in their proper location and orientation relative to images of physical items, AR devices must be calibrated so that their position and orientation in the robot work cell are known. Unfortunately, calibration of AR devices to achieve the required level of precision has traditionally been difficult and time consuming. One known technique involves analyzing images of a visual target to determine the position and orientation of the AR device. However, there is a large effort and a high cost associated with placing a planar visual target or "fiducial" (fixed basis of comparison) at some precise fixed location in the robot work cell. The transformation between the fiducial coordinate system and the robot coordinate system is required in six degrees of freedom. Any small tilt in the calibration plane could lead to large errors at longer distances. Any indirect calibration will result in calibration imprecision. Imprecise calibration leads to inaccuracies and limitations in AR system functionality.

Furthermore, calibrating to a 3D model of the robot in a single predefined pose may not be very precise because information is localized, and some robot axes may be occluded. Also, there is not much high frequency information in a robot axis, so information from a single robot axis may result in calibration imprecision. Also, "delta"-type robots (pick-and-place robots with multiple parallel links) could be impossible to calibrate using single axis methods.

Therefore, it is desired to provide a method of robot calibration for AR systems which does not suffer from the disadvantages discussed above.

SUMMARY

In accordance with the teachings of the present disclosure, a method for calibration of an augmented reality (AR) device's position and orientation based on a robot's positional configuration. A conventional visual calibration target is not required for AR device calibration. Instead, the robot itself, in any pose, is used as a three dimensional (3D) calibration target. The AR system is provided with a CAD model of the entire robot to use as a reference frame, and 3D models of the individual robot arms are combined into a single object model based on joint positions known from the robot controller. The 3D surface model of the entire robot in the current pose is then used for visual calibration of the AR system by analyzing images from the AR device camera in comparison to the surface model of the robot in the current pose. The technique is applicable to initial AR device calibration and to ongoing device tracking.

Additional features of the presently disclosed techniques will become apparent from the following description and appended claims, taken in conjunction with the accompanying drawings.

DETAILED DESCRIPTION OF THE EMBODIMENTS

The following discussion of the embodiments of the disclosure directed to a calibration of an augmented reality (AR) device's position and orientation based on a 3D surface model of a robot in any pose is merely exemplary in nature, and is in no way intended to limit the disclosed devices and techniques or their applications or uses.

The use of augmented reality (AR) systems in conjunction with industrial robots is known. For example, an AR system which assists a human operator in defining operational bounding zones was described in U.S. patent application Ser. No. 16/453,811, titled "VISUALIZATION AND MODIFICATION OF OPERATIONAL BOUNDING ZONES USING AUGMENTED REALITY", filed Jun. 26, 2019, hereby incorporated by reference in its entirety. In addition, an AR system which assists an operator in defining robot pick-and-place parameters was described in U.S. patent application Ser. No. 16/453,838, titled "AUGMENTED REALITY VISUALIZATION FOR ROBOTIC PICKING SYSTEM", filed Jun. 26, 2019, hereby incorporated by reference in its entirety.

The AR systems mentioned above use an AR device—typically either a headset apparatus or a tablet computer device—to overlay computer-generated virtual elements (such as zone boundaries, virtual parts, etc.) on images of a real-world robot and other objects in the work cell. Other applications define a "digital twin" robot which is a virtual replica of a real robot and may move independently from the real robot. In order to properly depict the virtual elements relative to the real robot and other physical objects, the AR device and the AR application software must know the location and orientation of the AR device within the work cell at all times.

Figure 1:
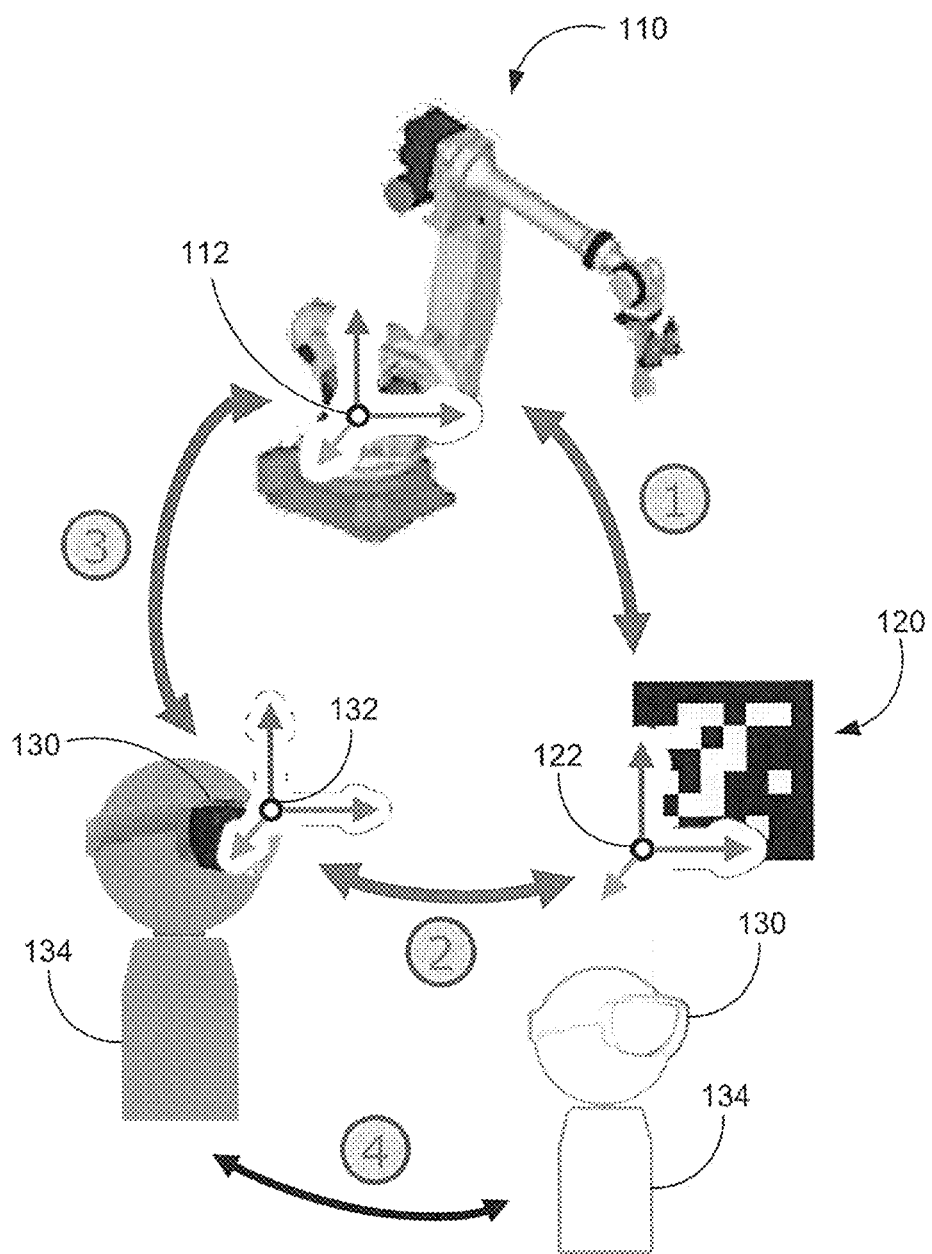
FIG. 1 is an illustration of a conventional technique for registering and tracking a location of an AR device in a robot work cell, where a visual target is required to be placed in a precisely measured location in the robot work cell, as known in the art.

FIG. 1 is an illustration of a technique for registering and tracking a location of an AR device in a robot work cell, as known in the art. A robot 110 is mounted in a work cell and has defined a robot base reference frame (coordinate system) 112. The robot 110 shown is a multi-axis industrial robot of a type known in the art. For example, the robot 110 may be a six axis robot which can be programmed to perform a variety of operations—such as material cutting, welding, part selection/movement/placement, etc. The robot 110 may have many other reference frames defined, such as one for each robot arm, and the position and orientation of each of these other reference frames may be defined directly or indirectly in terms of the base reference frame 112, as would be known by one skilled in the art. However, for the purposes of establishing an AR device location relative to the robot 110, only the base reference frame 112 is important.

A visual marker 120 is placed at a fixed location somewhere in the work cell. A marker reference frame 122 has an origin and orientation defined with respect to the marker 120. For example, the marker reference frame 122 may have its origin at one corner of the marker 120, and its X and Y axes extending along two edges of the marker 120. The location and orientation of the marker reference frame 122 with respect to the robot base reference frame 112 (shown as step ①) are determined through a measurement and calibration process known in the art. The transformation from the marker reference frame 122 to the robot base reference frame 112 includes three translations and three rotations, and it must be known exactly in order to avoid inaccuracies in the display of virtual items in the AR system. This may include making precise measurements of position and orientation of the marker 120.

An AR device 130 has an AR device reference frame 132 defined thereon. The AR device 130 may be a headset apparatus wearable by a user 134, where the headset includes a processor, inertial sensors, a camera and goggles which overlay computer-generated 3D images on top of the user's view of real-world objects. The AR device 130 may also be a handheld device such as a mobile phone, a tablet device or a robot teach pendant, in which case the device 130 still includes a processor, inertial sensors, a camera and a display screen, in addition to the required communications system. The AR device 130 runs an AR application on its processor.

Registering the AR device 130 to the robot base reference frame 112 is performed by pointing the camera in the AR device 130 at the visual marker 120 (shown as step ②) so that a plurality of images of the marker 120 are captured by the AR device 130. In practice, this is accomplished by pointing the camera of the AR device 130 at the marker 120 so that the marker 120 appears in the display of the AR device 130; natural movement of the AR device 130 (due to it being held or worn by a person) provides subsequent images of the marker 120 (which has a pattern and a location which are known to the robot controller and the AR application) from slightly different perspectives, allowing the AR application to determine the position and orientation of the AR device reference frame 132 relative to the marker reference frame 122. Because the position and orientation of the marker reference frame 122 relative to the robot base reference frame 112 are known from step ①), the AR application can compute the position and orientation of the AR device reference frame 132 relative to the robot base reference frame 112 (shown as step ③).

After the position and orientation of the AR device 130 are calibrated to the robot base reference frame 112, inertial and visual odometry are used by the AR application to continuously track the position and orientation of the AR device 130 relative to the robot base reference frame 112. In this technique (shown as step ④), the processor in the AR device 130 receives signals from accelerometers and gyros onboard the device 130 and continuously computes updated position and orientation of the device 130 based on integration of the acceleration and yaw rate signals. The position and orientation are checked and corrected based on images from the camera on the device 130, such as images of the marker 120 or other recognizable items which exist at a known location.

As would be understood by one skilled in the art, the robot base reference frame 112 need not be actually on the robot base, but rather may be any work cell coordinate frame, which is simply a fixed coordinate system in the work cell in which the robot operates. Straightforward transformations may be used to compute robot arm positions, the location of the marker 120, and the dynamic locations of the AR device 130, in any fixed work cell coordinate frame.

The technique shown in FIG. 1 and discussed above enables AR application software running on an AR device to continuously determine the position and orientation of the AR device relative to a robot and its work cell, which is a necessary capability in order for the AR device to accurately display virtual elements superimposed on real-world objects in the AR display. However, the technique of FIG. 1 relies on precise measurement of the position and orientation of the marker 120 with respect to the robot base reference frame 112. These measurements can be tedious, time-consuming and error-prone, where even a slight error in angular orientation can result in large errors in calibration of the AR device to the robot and work cell.

Not only is it difficult and time consuming to precisely place the marker 120 and determine the exact coordinate transformations to the robot base reference frame 112, but there are other problems with this traditional approach as well. In particular, it may be difficult to provide a target that is clearly visible from different positions in the work cell.

Other calibration techniques also suffer from similar limitations. For example, it has been proposed to use the robot as a 3D target by putting the robot in a particular predefined pose, providing a solid model of the robot in that particular pose, and analyzing camera images of the robot compared to the solid model to find one specific part or axis (such as the base). However, this technique suffers from the fact that the robot base may be occluded by other parts of the robot when viewed from many perspectives, thus making identification and location of the base axis impossible. In addition, calibrating to a single axis of a 3D model may not be very precise. Furthermore, calibration to "delta"-type pick-and-place robots would be impossible using a technique which only identifies a single axis in a 3D model.

The techniques of the present disclosure have been developed in order to simplify AR-to-robot calibration by eliminating the need for a precisely placed visual marker, while at the same time improving the accuracy of the calibration.

Figure 2:
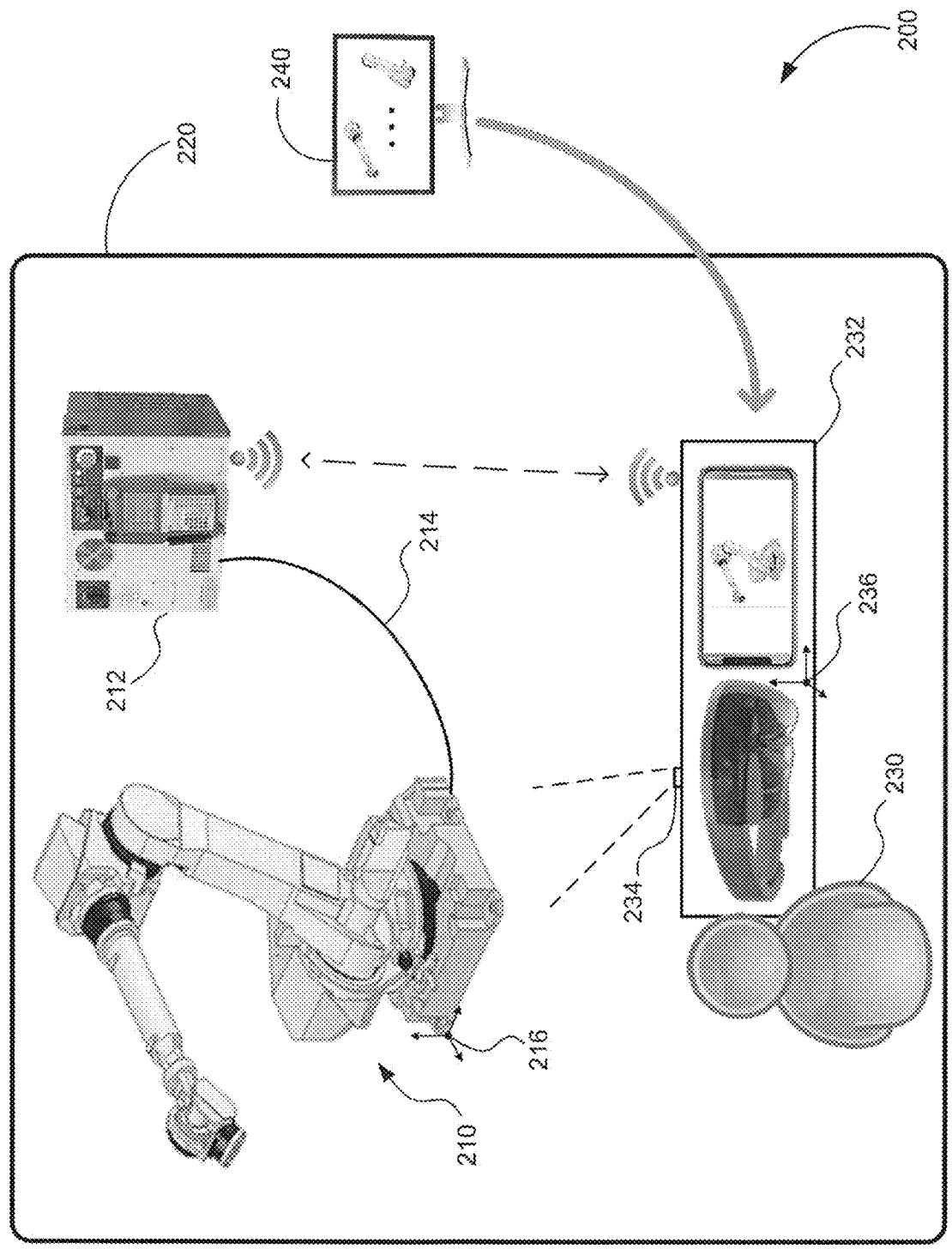
FIG. 2 is an illustration of a technique for calibration of an AR device to a robot coordinate frame where a 3D model of the robot and known robot kinematics enable the robot itself to be used as a visual target reference, according to an embodiment of the present disclosure.

FIG. 2 is an illustration of a system 200 for calibration of an AR device to a robot coordinate frame where a 3D model of the robot and known robot kinematics enable the robot itself to be used as a visual target reference, according to an embodiment of the present disclosure. A robot 210 is located in and operates in a work cell 220. The robot 210 is depicted as a traditional multi-axis articulated industrial robot with arms connected in series at rotational joints, but may be a "delta"-type pick-and-place robot with multiple parallel links, or any other type of robot—including, but not limited to, industrial robots configured for part/material movement, welding, painting or other applications. In fact, while a robot is used for illustration in FIG. 2, the disclosed technique for AR device calibration could be used with any type of articulated machine which is capable of assuming different poses and communicating the pose geometry.

The robot 210 communicates with a controller 212, typically via a cable 214. As is known in the art, the controller 212 includes a processor and memory with instructions for operating the robot 210 according to a program, where the controller 212 receives position information from joint encoders on the robot 210 and sends commands to the robot 210 defining joint motor motion. Only one robot 210 is shown, but the system 200 may include many of the robots 210 operating within the work cell 220. When more than one of the robots 210 is included in the system 200, each of the robots 210 may have its own controller 212, and the controllers 212 communicate with each other.

The robot 210 has a robot base reference frame 216, where the positions of all robot arms are always known relative to the robot base reference frame 216 through kinematics calculations. That is, the kinematics of the robot, particularly the length of each arm from one joint center to the next, is known exactly. Joint angular position is also known at all times from joint position encoders. Beginning with a base joint, which may have its rotational axis aligned with an axis of the robot base reference frame 216, the position of each arm and the location of the joint center at the end of each arm can be computed in the coordinates of the robot base reference frame 216. Other local coordinate frames may also be defined, such as one coordinate frame fixed to each arm, as would be understood by those skilled in the art.

An operator 230 is present in the work cell 220 during operations of the robot 210. The operator 230 uses an AR device 232 to run an augmented reality (AR) application program. As discussed above, the AR device 232 may be a headset apparatus worn by the operator 230 or a handheld device (e.g., a smart phone, a tablet or a teach pendant) held by the operator 230. When the AR device 232 is a headset, the headset includes a processor, inertial sensors, a camera and goggles which overlay computer-generated 3D images on top of the user's view or camera images of real-world objects. The AR device 232 may also be a handheld device, in which case the device 232 still includes a processor, inertial sensors, a camera and a display screen, in addition to the required communications system. The AR application program provides augmented reality features and functions used in robot configuration to the operator 230—such as virtual displays of robot paths, programs, boundaries and/or outputs superimposed on the operator's view of the robot 210 and other elements located in the work cell 220.

The AR device 232 is in wireless communication with the controller 212 so that the AR application program and the robot control program can maintain a two-way exchange of data. At a minimum, the controller 212 provides joint position information in real time to the AR device 232 which the AR application uses to determine a robot pose in the calibration technique discussed below. In the multi-axis robot 210 of FIG. 2, the joint position information includes joint angular position for each joint, which may be determined from joint encoders at each joint in the robot 210 as known in the art. The AR application program may also provide the location and orientation of the AR device 232 and/or other data to the controller 212. The wireless communication between the AR device 232 and the controller 212 may be via a wireless local area network (WiFi), Bluetooth, cellular communication or any other suitable wireless technology. If the work cell 220 includes a plurality of the robots 210, then the AR device 232 preferably communicates wirelessly with only one of the controllers 212 (designated as a master).

The AR device 232 includes at least one camera or other sensor 234. The camera or other sensor 234 may include one or more cameras, an ultrasonic sensor, a radar sensor, a LiDAR (light detection and ranging) sensor, an infrared sensor, or any other type of sensor suitable for sensing an object and determining a pose of the robot as discussed below. In a preferred embodiment, the camera or other sensor 234 is at least one camera which takes digital images of the robot 210 and compares the images to a solid/surface model of the robot 210 in its current pose to determine the position and orientation of the AR device 232.

The AR device 232 has an AR device reference frame 236 assigned thereto. The AR device reference frame 236 has a fixed position and orientation relative to the AR device 232 (whether a headset or a handheld device), and the position and orientation of the AR device reference frame 236 relative to the robot base reference frame 216 must be known at all times in order to properly display virtual items in the AR application program. It is the determination of the position and orientation of the AR device reference frame 236 relative to the robot base reference frame 216 (a coordinate transformation involving translations in three orthogonal directions and rotations about three axes) that is the subject of the techniques of the present disclosure.

A computer 240 provides CAD data to the AR device 232. The CAD data includes a solid or meshed surface model of each arm (each independently moving part) of the robot 210. The computer 240 may be any type of computer, server or storage device capable of providing the CAD data to the AR device 232. Although a hardwire connection between the computer 240 and the AR device 232 may be used, a wireless connection (WiFi, etc.) is preferred.

The calibration techniques of the present disclosure perform a direct calculation of the robot base position with respect to the AR device 232. In other words, the AR device 232 calculates the position and orientation of the AR device reference frame 236 relative to the robot base reference frame 216 (or vice versa), with no need for the visual marker 120 shown in FIG. 1. This calibration technique does not require visibility of all robot axes/arms, so it is not a problem if the robot base is occluded in some viewing positions or robot poses. The disclosed calibration technique can be extremely precise, because the robot world frame is always exactly at the correct spot.

The solution according to the present disclosure is to provide the AR application program with a 3D solid or surface model of the entire robot 210 in its current pose as the reference frame for everything in the virtual world. The calibration is accomplished by analyzing images of the robot 210 in comparison to the surface model of the robot 210 to determine the exact line of sight and viewing distance of the AR device camera to the robot 210. Calibrating to a planar visual target is not required.

The disclosed calibration technique utilizes a 3D target to calibrate the location of the AR device 232, and the 3D target is the entire robot 210. The 3D target might include customer tools (at a tool center point reference frame) if CAD data for the tool is available. A 3D visual target as used in the presently disclosed technique enables much greater calibration precision than a 2D target as used in previous techniques.

The disclosed calibration technique works as follows. 3D solid or surface models of the individual robot arms are provided to the AR device 232 from the computer 240. This data transfer only needs to happen once for a particular model of robot. Joint position data for a current pose of the robot 210 is provided from the controller 212 to the AR device 232. It is important to note that the disclosed technique works for any pose of the robot 210, not just a particular predetermined pose (such as a home position). As long as the joint position data is known by the robot controller 212 and communicated to the AR device 232, the AR application program can compute a solid/surface model of the entire robot 232 in the current pose. This is done by using the joint position data to place the CAD model of each robot arm in the proper location and orientation, starting with the robot base and continuing in sequence out to the wrist part, such that the CAD solid/surface data of each arm component is constructed into a model of the entire robot 210 in the current pose.

With a model of the entire robot 210 in the current pose now known, the AR application program can analyze images of the robot 210 taken by the camera 234 to determine the exact location and viewing angle from which the images were taken. The image analysis and comparison to the robot solid/surface model may include techniques for recognition of certain robot features—such as recognizable features on the robot base, features on the inner arm, features on the outer arm, etc.—to quickly determine the approximate viewing angle of the AR device camera. Additional analysis of the images in comparison to the robot solid/surface model will result in the exact viewing angle and distance from which the images were taken.

The positions of various points on the robot 210 are determined during its motion using a variety of sensors. The sensors may include light-based sensors such as laser sensors, audio spectrum sensors such as ultrasound, time-of-flight based sensors, radar, LiDar, etc., in addition to or instead of the one or more cameras discussed above. Joint encoders are also included in the robot 210 itself for determining robot pose.

In summary, the robot 3D target changes as the robot moves. The AR system can use the robot in the current pose as the target. By continuously using itself as the 3D target, the calibration process is self-correcting. Every triangle in the robot model (used for meshing the solid model display of the robot arms in the AR system) is at a known position at all times. Thus, the disclosed calibration technique can be used to initially establish an AR device position and orientation, and can also be used for ongoing AR device location tracking.

After the position and orientation of the AR device 232 are calibrated to the robot base reference frame 216 as discussed above, inertial and visual odometry are used by the AR application software to continuously track the position and orientation of the AR device 232 relative to the robot base reference frame 216. In this technique, the processor in the AR device 232 receives signals from accelerometers and gyros onboard the AR device 232 and continuously computes updated position and orientation of the AR device 232 based on integration of the acceleration and yaw rate signals. The position and orientation are checked and corrected based on images from the camera on the AR device 232, such as images of the robot itself or other recognizable items which exist at a known location in the work cell 220. Thus, as the operator 230 walks around the work cell 220 and the AR device 232 takes images of the robot 210 from multiple different positions and perspectives, each of the images is analyzed to determine the position and orientation of the AR device 232, and the cumulative effect of the inertial odometry and multiple image analysis is an extremely accurate calculation of AR device position and orientation.

It is to be understood that the AR device 232 runs an AR application program which is used by the operator 230 for the program's beneficial features in robot set-up, configuration, operation, troubleshooting, or some other function. The technique for calibrating the location and orientation of the AR device 232 relative to the robot 210 using camera images and a solid/surface model of the robot itself in any pose, according to the presently disclosed techniques, is a beneficial feature which may be incorporated into any such AR application program.

The preceding discussion describes calibration of the AR device's position and orientation by comparing camera images of the robot 210 in a current pose to a solid/surface model of the robot 210 in the same current pose. With sufficiently fast communication between the AR device 232 and the controller 212, and sufficiently fast calculations in the AR device 232, the robot 210 need only remain in the pose for a brief moment. In fact, with sufficient communications and computing speed, one skilled in the art can envision that the AR device calibration can be performed in an ongoing basis with the robot continuously running a program, with constant motion punctuated by only very brief stoppages or reversals of direction. In other words, the AR device calibration can occur while the robot 210 is in operation, not just when it is stationary.

Other embodiments of the present disclosure are also envisioned. One such embodiment is where, instead of calibrating the AR device's location to a 3D model of a robot having multiple rigid arms, the AR device's location is calibrated to a 3D model of a device having at least one completely flexible element. For example, a robot which includes a flexible paint hose or a flexible hydraulic hose could also include encoders which determine points in space along the length of the flexible hose, and the point data could be used to create a solid/surface model of the flexible hose for comparison to image data.

In another embodiment, the work cell contains multiple robots, and each robot has a specific identifier. Joint position data for each robot can be provided to the AR device, along with solid/surface models of each part of each robot, enabling construction of a solid/surface model of all robots in the work cell. The resulting image analysis to determine AR device location will have a tremendous wealth of data upon which to base the calculation, and the AR device location will be computed with great precision. In addition, this technique can be used to map the locations of robots and other objects in the work cell relative to a primary robot, rather than performing painstaking measurements of the locations of all of the other robots and objects.

Figure 3:
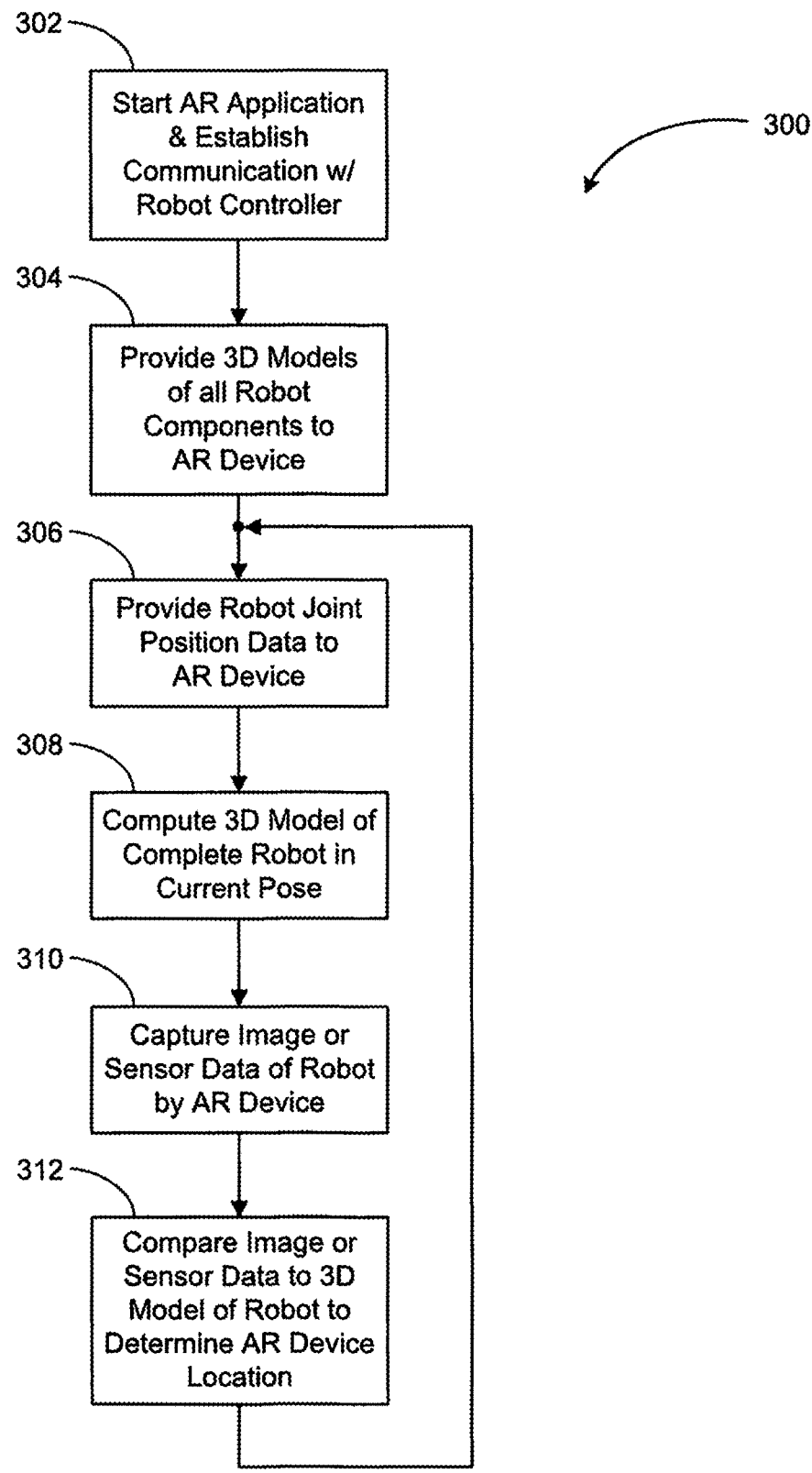
FIG. 3 is a flowchart diagram of a method for registering and tracking a location of an AR device in a robot work cell using the robot itself as a visual target reference, according to an embodiment of the present disclosure.

FIG. 3 is a flowchart diagram 300 of a method for registering and tracking a location of an AR device in a robot work cell using the robot itself as a visual target reference, according to an embodiment of the present disclosure. At box 302, the operator 230 starts the AR software application (app) on the AR device 232 and the AR device 232 establishes communication with the robot controller 212 via a wireless communication channel, as discussed earlier.

At box 304, 3D models of all robot components are provided to the AR device 232. In a preferred embodiment, the 3D models are solid models or surface models from a CAD system such as the computer 240 of FIG. 2. The 3D model of each individual component (e.g., robot arm) is provided, along with identification information (e.g., robot base, inner arm, outer arm, etc.) and indexing information (joint center points and rotational position indexing) enabling each component 3D model to be accurately placed in a full robot model based on joint position information.

At box 306, robot joint position data is provided from the controller 212 to the AR device 232 for a current pose of the robot 210. The joint position data is measured by joint encoders in the robot 210 and provided to the robot controller 212. In the case of a multi-arm articulated robot as shown in FIG. 2, the joint position data includes an angular position for each of the six joints. At box 308, a 3D solid or surface model of the complete robot in the current pose is constructed using the joint position data from the box 306 and the component solid/surface models from the box 304. For example, a first component (attached to a robot base) is oriented according to Joint1 position information; the orientation and geometry of the first component thus defines the location of Joint2, and the next component has its inner joint placed at that location, with an orientation based on the Joint2 angle data, etc. For an articulated robot, this geometric construction technique continues through inner arms to outer arms and a wrist part, thus fully defining the robot geometry. A corresponding technique may be used for constructing a 3D model of a "delta"-type robot using component models and joint position data.

It is also possible to use measured Cartesian coordinate data to define the robot pose. In this embodiment, sensors determine the position of certain locations on the robot 210, such as the Cartesian coordinates (in the robot base reference frame 216) of two ends of each arm part, rather than using joint position data.

At box 310, image or sensor data of the robot 210 in the current pose is captured by the AR device 232. In one embodiment, the image or sensor data is images from one or more cameras on the AR device 232. In other embodiments, the image or sensor data is data defining surfaces on the robot 210 from laser sensors, audio spectrum sensors such as ultrasound, time-of-flight based sensors, radar, LiDar, or any other suitable type of sensor.

At box 312, the image or sensor data from the box 310 is compared to the 3D model from the box 308 in order to determine the location of the AR device 232. It can be intuitively understood that there is only one AR device position and orientation in the work cell 220 which will cause the 3D model from the box 308 to exactly correspond to the images from the camera or other sensor 234 from the box 310. In the calculations at the box 312, the viewing perspective of the 3D model is adjusted until the model's appearance matches the images from the camera or other sensor 234, and that viewing perspective (line of sight and distance) defines the location and orientation of the AR device 232.

After the first time the AR device location is calculated at the box 312, and continuously thereafter, the AR device 232 communicates the device location and orientation to the robot controller 212 if necessary for any application functionality (such as calculation of an operator safety zone by the controller 212). At the same time, the operator 230 uses the AR application software, running on the AR device 232, for its intended purpose. As discussed earlier, the AR application software may be used for robot set-up, configuration, operation monitoring, troubleshooting, or some other function.

After the box 312, the process of the flowchart diagram 300 may return to the box 306 where new robot joint position data are communicated to the AR device 232 from the controller 212, the AR device location is again computed accordingly, and the process continuously loops in real time as long as the AR device 232 is powered on and located within the work cell 220. In each subsequent calculation at the box 312, inertial and visual odometry are used by the AR application software to continuously track the position and orientation of the AR device 232 relative to the robot base reference frame 216. In this technique, the processor in the AR device 232 receives signals from accelerometers and gyros onboard the AR device 232 and continuously computes updated position and orientation of the AR device 232 based on integration of the acceleration and yaw rate signals. The position and orientation are checked and corrected based on images from the camera or other sensor 234 on the AR device 232, particularly including images of the robot 210 itself at the same pose as the original calibration or at any other pose. The continuous tracking of the AR device position and orientation using inertial and visual odometry provide extremely accurate results which enable the AR application software to properly display virtual items in the AR display in real time.

Multiple robots may be included in the work cell 240, where all robots provide joint position data, and the AR device 232 computes its position in the work cell 220 based on all of the robot poses instead of just a single robot. Alternately, after the AR device position and orientation are computed based on a single robot's pose, the location of other robots and other objects in the work cell 220 may be mapped by comparing their images to known solid/surface models of the other robots and other objects.

Throughout the preceding discussion, various computers and controllers are described and implied. It is to be understood that the software applications and modules of these computers and controllers are executed on one or more computing devices having a processor and a memory module. In particular, this includes processors in the computer 240, the robot controller 212 and the AR device 232 discussed above. Communication between these devices, and between these devices and any other devices (such as a tablet device, a teach pendant or a factory master controller) may be over a hard-wire network, or may use any suitable wireless technology—such as a cellular phone/data network, Wi-Fi, broadband Internet, Bluetooth, etc.

As outlined above, the disclosed techniques for calibration of an augmented reality (AR) device's position and orientation based on a 3D solid/surface model of a robot in any pose offer several advantages over prior art techniques. The ability to compute the AR device's location using the robot itself in any pose as the visual target, and then continuously re-calibrate the AR device's location using visual odometry on the robot in combination with inertial odometry, is far superior to prior techniques which relied on precise placement of a planar target or visual analysis of the robot only in a particular pose.

While a number of exemplary aspects and embodiments of the method and system for calibration of an AR device's position and orientation based on a 3D solid/surface model of a robot in any pose have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for calibrating an augmented reality (AR) device to a robot base reference frame, said method comprising:
   providing a three-dimensional (3D) model of each structural component of a robot to the AR device;
   providing position data for all joints of the robot in a current pose from a robot controller to the AR device;
   computing a 3D model of the robot in the current pose, by the AR device, using the 3D models of the components and the position data;
   capturing image or sensor data of the robot in the current pose by one or more camera or sensor in the AR device; and
   comparing the image or sensor data of the robot to the 3D model of the robot to determine a position and orientation of the AR device with respect to the robot base reference frame.

2. The method according to claim 1 wherein the 3D models of each of the structural components of the robot are computer aided design (CAD) solid or surface models.

3. The method according to claim 1 wherein the AR device is a headset apparatus worn by an operator, or the AR device is a smart phone, a tablet computing device or a robot teach pendant held by the operator.

4. The method according to claim 1 wherein the robot is an articulated robot having multiple arms connected in series, and the position data is joint angular position data measured by joint encoders in the robot.

5. The method according to claim 1 wherein the robot is an articulated robot having multiple arms connected in series, and the position data is joint Cartesian coordinates measured by sensors on the robot.

6. The method according to claim 1 wherein the robot is a delta-type robot having multiple parallel links connecting a moving pick-and-place head to a fixed hub.

7. The method according to claim 1 wherein the image or sensor data is digital images of the robot taken by one or more cameras in the AR device.

8. The method according to claim 1 wherein the image or sensor data is data from a laser sensor, an audio spectrum sensor, a time-of-flight based sensor, a radar sensor or a LiDar sensor.

9. The method according to claim 1 further comprising continuously recalculating the position and orientation of the AR device with respect to the robot base reference frame, including making inertial odometry calculations based on signals from accelerometers and yaw rate sensors in the AR device.

10. The method according to claim 9 further comprising error-correcting the inertial odometry calculations by comparing image or sensor data of the robot in a new pose to a 3D model of the robot in the new pose to determine a position and orientation of the AR device with respect to the robot base reference frame.

11. The method according to claim 1 further comprising using the position and orientation of the AR device with respect to the robot base reference frame, by an AR application program running on the AR device, in order to properly depict virtual elements on a display of the AR device.

12. The method according to claim 1 wherein providing the position data, computing the 3D model of the robot, capturing the image or sensor data and comparing the image or sensor data to the 3D model occur while the robot is parked in a stationary position.

13. The method according to claim 1 wherein providing the position data, computing the 3D model of the robot, capturing the image or sensor data and comparing the image or sensor data to the 3D model occur while the robot is running a motion program.

14. A system for calibrating an augmented reality (AR) device to a robot base reference frame, said system comprising:
   an industrial robot having a plurality of structural components;
   a robot controller in communication with the robot, said controller including a processor and memory and being configured with robot operational control software; and
   an augmented reality (AR) device in communication with the robot controller, said AR device having one or more camera or object sensor, position tracking sensors, a display, and a processor and memory configured to run an AR application,
   where the robot controller provides position data for all joints of the robot in a current pose to the AR device, and
   the AR device computes a 3D model of the robot in the current pose using 3D models of the structural components and the position data, captures image or sensor data of the robot in the current pose using the one or more camera or sensor, and compares the image or sensor data of the robot to the 3D model of the robot to determine a position and orientation of the AR device with respect to the robot base reference frame.

15. The system according to claim 14 wherein the AR device is a headset apparatus worn by an operator, or the AR device is a smart phone, a tablet computing device or a robot teach pendant held by the operator.

16. The system according to claim 14 wherein the robot is an articulated robot having multiple arms connected in series, or the robot is a delta-type robot having multiple parallel links connecting a moving pick-and-place head to a fixed hub.

17. The system according to claim 14 wherein the image or sensor data is digital images of the robot taken by one or more cameras in the AR device, or the image or sensor data is object data from a laser sensor, an audio spectrum sensor, a time-of-flight based sensor, a radar sensor or a LiDar sensor.

18. The system according to claim 14 wherein the 3D models of the structural components of the robot are computer aided design (CAD) solid or surface models.

19. The system according to claim 14 wherein the AR device continuously recalculates the position and orientation of the AR device with respect to the robot base reference frame, including making inertial odometry calculations based on signals from the position tracking sensors, and error-correcting the inertial odometry calculations by comparing image or sensor data of the robot in a new pose to a 3D model of the robot in the new pose.

20. The system according to claim 14 wherein the position and orientation of the AR device with respect to the robot base reference frame are used in an AR application program running on the AR device in order to properly depict virtual elements on a display of the AR device.

21. The system according to claim 14 wherein providing the position data, computing the 3D model of the robot, capturing the image or sensor data and comparing the image or sensor data to the 3D model occur while the robot is parked in a stationary position or occur while the robot is running a motion program.

22. A method for calibrating an augmented reality (AR) device to a machine base reference frame, said method comprising:
   providing a three-dimensional (3D) model of each structural component of an articulated machine to the AR device;
   providing position data for all parts of the machine in a current pose from a machine controller to the AR device;
   computing a 3D model of the machine in the current pose, by the AR device, using the 3D models of the components and the position data;
   capturing image or sensor data of the machine in the current pose by one or more camera or sensor in the AR device; and
   comparing the image or sensor data of the machine to the 3D model of the machine to determine a position and orientation of the AR device with respect to the machine base reference frame.

23. The method according to claim 22 wherein the position and orientation of the AR device with respect to the machine base reference frame are used in a program running on a simulation system in order to properly display movements of a digital twin of the machine, where the digital twin is a virtual replica of the machine which is calibrated by the AR device.

24. The method according to claim 22 further comprising mapping locations and orientations of other machines and other objects in the machine base reference frame, by the AR device, including comparing images of the other machines and other objects to known solid/surface models of the other machines and other objects.

* * * * *